Dec. 3, 1963
J. M. GISSLEN
3,112,865
BLADE PLATFORM STRUCTURE
Filed Oct. 3, 1961
2 Sheets-Sheet 1
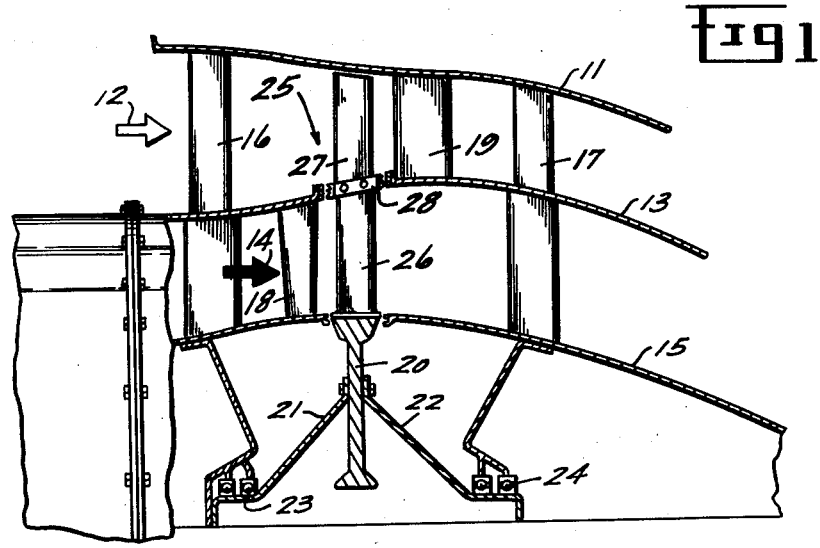
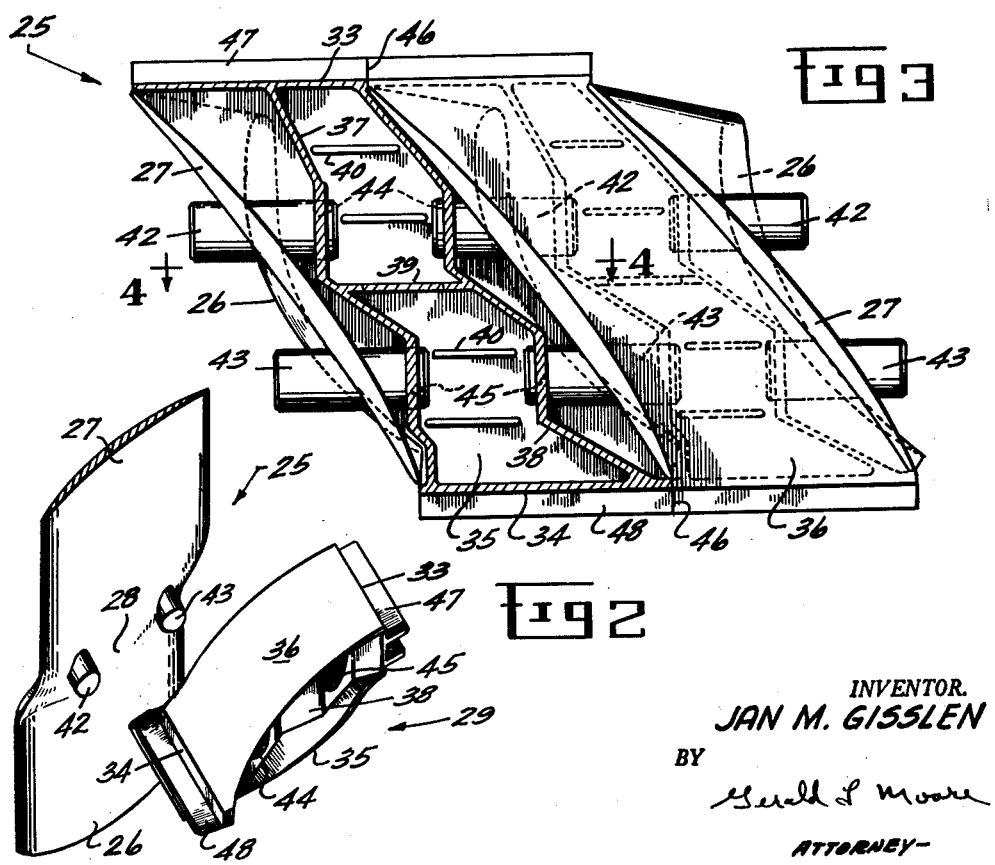
INVENTOR.
JAN M. GISSLEN
BY
Gerald L Moore
ATTORNEY-

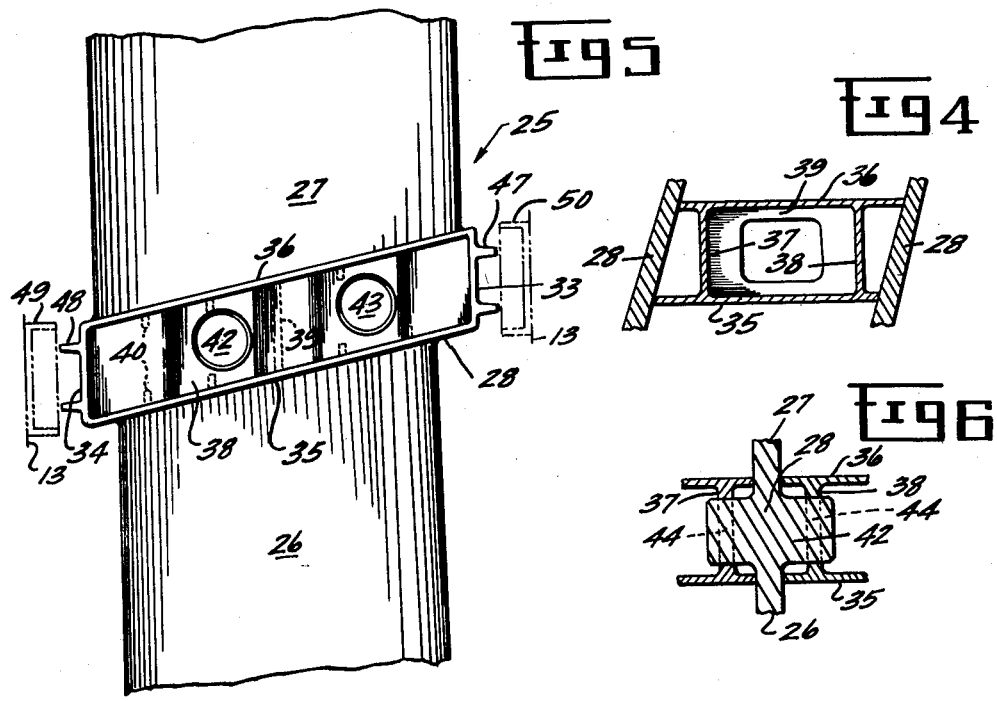
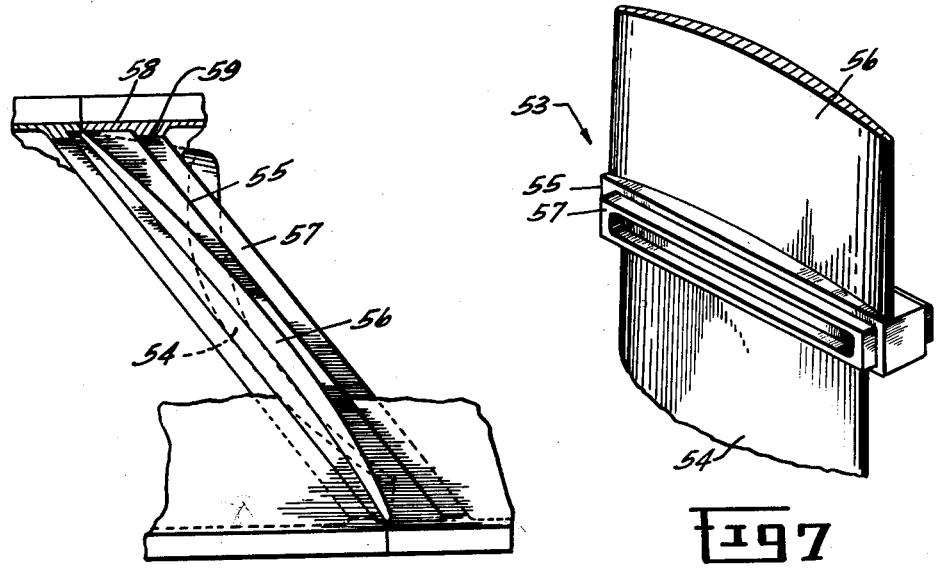

United States Patent Office 3,112,865
Patented Dec. 3, 1963

3,112,865
BLADE PLATFORM STRUCTURE
Jan M. Gisslen, Cincinnati, Ohio, assignor to General Electric Company, a corporation of New York
Filed Oct. 3, 1961, Ser. No. 142,651
4 Claims. (Cl. 230—116)

The present invention relates to a blade platform structure and more specifically to sealing means for turbomachinery blading for sealing between adjacent blade members of a gas turbine engine.

The present invention offers particular advantages, but is not limited in use to turbojet engines of the post-turbine fan type. In turbojet engines of this type, separate concentric airflow paths are utilized, one being the normal or primary flow path through the turbojet, a second being a concentric secondary flow. A "fan section" is utilized comprising a rotor having dual sectioned blades or buckets, a turbine section extending through the primary or turbine exhaust flow and a compressor section extending through the secondary flow. The primary flow drives or imparts rotary motion on the buckets which in turn causes the compressor section to compress the secondary flow. In this manner, the engine flow mass is increased while the velocity of the primary flow is decreased thereby increasing the overall efficiency of the engine.

In such fan engines, however, it is necessary to seal between adjacent blades to prevent the radial exchange of gas between the concentric passages. The problem is amplified because of the extreme differences in temperature and pressure between the gas flow streams, the turbine exhaust stream being of a high pressure and temperature while the fan flow is initially of atmospheric pressure and temperature. Other than sealing problems in such an engine are problems of internal stressing resulting from the unequal expansion of the seal which result from being subjected to the hot exhaust gases on one side and the cool atmospheric temperatures on the other.

Furthermore, the seal must be directly supported on the fan blade structure of the fan rotor thereby making weight a serious consideration since the centrifugal forces exerted by the seal are directly proportional to the weight thereof. In addition, the seal should be supported in a manner to permit ease of replacement if necessary.

One additional function of such a sealing means is providing structural rigidity to the overall rotor and blade structure. Since the blades in such an application are compound, having a turbine or driven portion subjected to the turbine exhaust, and a driven or fan flow compressing portion in the fan or secondary flow, substantial vibratory and twisting forces are exerted on the blades which are amplified by the fact that the blades are longer than those usually encountered because of the necessity of extending laterally through two flow passageways. The seal must therefore be constructed in a manner to add rigidity to the fan rotor assembly and damp any vibrations induced in the blades.

It can be seen that in the past problems have arisen in providing sealing at this juncture in a fan type engine, which sometimes is referred to as the midplatform of the fan blades, in that where the midplatform is machined integral with the fan blade an expensive machining operation has of necessity been employed in order to provide a seal assembly which satisfies the requirements set forth heretofore. This forged or machined assembly has also been quite heavy thereby causing additional stresses in the rotor assembly.

It is therefore one object of my invention to provide an improved, lightweight sealing means for turbomachinery blading.

It is a further object of my invention to provide a simplified type of blade sealing means requiring little if any precision machining.

It is another object of my invention to provide blade sealing means which minimize the heat exchange between passageways lateral to the blade sealed.

It is another object of my invention to provide a sealing means which also serve to assist in damping vibrations between adjacent blades on a bladed rotor.

In accordance with one embodiment of my invention, I provide a thin-walled sealing member having four walls forming a fabricated box structure with the walls extending normal to the adjacent turbine blades to close the space between these blades and thereby seal the gas flow passageway. Means for supporting the sealing structure in this position comprise projections on the blades opposite the sealing member with a cooperating member on the sealing member to maintain the sealing member in position.

Other objects and advantages of this invention will be readily understood and appreciated by reference to the following detailed description when considered in connection with the accompanying drawings wherein:

FIGURE 1 illustrates a normal bypass fan turbo-engine in which the sealing means may be utilized;

FIGURE 2 is a perspective view showing the interfitting relationship between the blade and seal;

FIGURE 3 is a plan view of the sealing means incorporated between adjacent turbine blades with the top wall of one sealing means cut away;

FIGURE 4 is a cross-sectional view of the sealing means and adjacent turbine blades along the line 4—4 of FIGURE 2;

FIGURE 5 is a side view of the sealing means attached to one blade only;

FIGURE 6 is a top cross-sectional view of a portion of the turbine blade and the sealing means showing one modification of the cooperating support means of the blade and seal;

FIGURE 7 is a perspective view of a turbine blade showing another type of support structure which may be provided for the seal;

FIGURE 8 is a top view of the support structure of FIGURE 6 with the sealing means partially cut away to illustrate the cooperating relationship between the seal and blade support means.

Referring now more particularly to FIGURE 1, there is illustrated a post-turbine fan type turbo-augmentor attached to the aft end of a turbojet engine which may be of otherwise conventional construction. As shown, the static structure of the turbo-augmentor includes an outer casing or wall 11 which encloses the entire assemblage and provides an inlet for secondary air illustrated by the arrow 12. An intermediate wall 13 separates the secondary air stream 12 from the turbine exhaust stream illustrated by the arrow 14, and the internal wall 15 completes the exhaust flow passage with the three walls being connected by radial struts 16 and 17 and by vanes 18 and 19 which serve as turbine nozzle and outlet guide vanes, respectively. The rotating structure of the turbo-augmentor comprises a single stage rotor which includes a rotor wheel 20 connected fore and aft to shafts 21 and 22 supported in bearings 23 and 24, respectively. The bearings are in turn attached to the inner wall section 15 and are carried by the static structure of the augmentor. A plurality of dual airfoils generally indicated at 25 are mounted on the periphery of the rotor wheel and extend radially across both the turbine exhaust passageway defined by the walls 13 and 15 and secondary air passage defined by walls 11 and 13. Each dual airfoil includes a turbine bucket 26 and a compressor blade 27 jointed in axial relation by means of the transition section 28.

It is in such a structure that the sealing means of the present invention may be employed to seal the space between adjacent blades and thereby prevent a gas flow between the secondary air flow passage and the turbine exhaust passage. It should be pointed out, however, that although this embodiment of the invention is described in an application to fan-type turbine engines, the sealing means of this invention could also be employed in a turbine or compressor to seal between adjacent blades and prevent gas flow between the main gas flow passage and the interior of the turbine or compressor wheel.

Referring now to FIGURES 2 and 3, there is illustrated an assembly comprising compressor blades 27 between each two of which is located one of the sealing means of this invention. The turbine section 26 of the blade is illustrated by the dotted lines. As can be seen in the drawing, the sealing means generally indicated as at 29 is formed to fit the contours of adjacent blades at their transition sections so as to effectively seal the space therebetween and prevent gas flow between the lateral sections of the blade. The sealing means comprises side walls 33 and 34 and a bottom wall 35 and top wall 36. The top wall 36 has been removed from the sealing means on the left hand side of the drawing to disclose the interior of the seal. Herein are shown the two strengthening members 37 and 38 which extend between the end walls 33 and 34 and may be welded or otherwise fastened in place. Another strengthening member 39 extends normal to these members to provide additional support and may be fastened in the same manner. In addition, the intermediate members 40 may be attached to both the top wall 36 and the bottom wall 35 to provide additional rigidity to these walls where a thin wall structure is used.

The means for supporting the seal from the blades comprises studs 42 and 43 fixed to the blades proper at their transition sections where the seal is to be positioned. Cooperating openings 44 and 45 in the strengthening members 37 and 38 of the seal, respectively, receive the studs or lugs 42 and 43 to support the seal in place, the fit between the studs and seal openings preferably being slightly loose to enhance the damping function hereinafter described. By using this type of supporting structure the seal is readily removable and yet, when all the seals are in place between adjacent blades, there is no danger of the seal accidentally being thrown out of the rotor assembly since the centrifugal forces are normal to the support means. In addition to sealing and because the fit between the stud members 42 and the strengthening member 44 is a slip fit, a very slight amount of movement is permitted between the seal and adjacent blade which serves to damp any vibrations which might occur between adjacent blades.

The end walls 33 and 34 extend partially past the blade to the midpoint thereof where it abuts the adjoining seal end walls to form a seam 46. This structure provides for mutual support between adjacent seals and provides a rigidity to the assembly similar to a continuous sealing ring by allowing the abutting edges to resist any torque which may be impressed upon the blades. In this manner, a stronger overall rotor assembly is provided. In addition, sealing teeth 47 and 48 may be attached to the end walls 33 and 34 of the seal to engage fixed sealing members 49 and 50 carried by the intermediate wall sections 13 to prevent leakage of gases from one passageway to the other thereby providing a more gas tight seal arrangement.

Referring now to FIG. 4, the cross section of the seal assembly is shown with the bottom and top members 34 and 36 and the side members 37 and 38 forming a rigid box-like structure with lateral rigidity provided by the intermediate strengthening member 39. The seal closely abuts the transition section 28 of the blades and provides a rigid sealing structure therewith.

FIGURES 5 and 6 are cross-sections of the transition portion of the blade showing the bottom and top walls 35 and 36 of the seal and the side wall 37 with the opening 44 therethrough cooperating with the stud 42 extending in both directions from the blade transition section to support the seal member. The stud member 42 may be either cast and machined integral with the blade or may be assembled through a hole in the blade after the blade forming operation is performed.

Referring now to FIGURES 7 and 8, there is illustrated another embodiment of the invention. In general, the cross-section of the seal member is similar to that illustrated in FIGURE 5 with the principal difference being in the support means for the seal. In this embodiment, a dual airfoil generally indicated as at 53 is illustrated comprising a turbine section 54, a midplatform or a transition section 55 and a compressor section 56. Attached to the intermediate portion of the blade is the supporting structure for the seal comprising a projection 57 extending outward from the intermediate portion 55 which interfits with an opening 59 in the strengthening member 58. A slip fit connection therebetween supports the seal in position much in the same manner as in the preceding embodiment. The seal slips over the projection 57 and abuts the wall or intermediate portion of the blade 55. In the same manner as the preceding embodiment, the seal extends around the blade transition section to abut the adjoining seal at the seams 60 in the same advantageous manner heretofore discussed.

In addition, however, this embodiment provides a straight line joint between the seal and the transition section therefore providing a very close fitting overlapping seam between the seal and the projection 57 and a gas-tight sealing structure.

To assemble the rotor, the dual airfoils 25 are attached to the rotor wheel 20 in a manner well known to the art and the seal members 29 are inserted between adjacent airfoils with the cooperating members on the transition section of the airfoil and the seal member interfitting to maintain the seal in place. As the rotor assembly rotates in operation in the usual manner, the support means maintains the seal in position and prevents a radial transfer of gas between the flow passageways.

It can be seen from the foregoing that a lightweight simplified seal assembly is provided which may be fabricated with a minimum amount of precision machining. In addition to effectively sealing between the midplatforms of adjacent blades, the seal serves to damp vibrations between adjacent blades, adds to the rigidity of the rotor assembly by resisting the twisting and vibratory forces exerted on the blades, is unaffected by the extreme temperature differentials encountered because of the box-like spaced wall structure utilized, and is easily replaceable if the need arises.

In the claims:

1. In a turbo-machine rotor having a plurality of blades circumferentially spaced around the periphery of said rotor,
   sealing means for sealing the space between adjacent blades comprising a thin-walled box member,
   means for supporting said box member between adjacent blades in abutting relationship to each blade,
   said means for support including supporting lugs attached to one blade and a concave walled structure on the sealing means adjacent each said lug to interfit with said lug and support the sealing means in the space between adjacent blades.

2. In a turbo-machine rotor having a plurality of blades circumferentially spaced around the entire periphery of said rotor,
   sealing means for sealing the space between adjacent blades comprising a six walled box-like structure fabricated of sheet material,
   said box-like structure having intermediate support walls located internally,
   means to support said sealing means between adjacent blades with one wall substantially parallel to each adjacent blade, said means to support including a projecting lug attached to one of the adjacent blades with an opening in the adjacent sealing means wall which interfits with said lug to maintain said sealing means between the adjacent blades.

3. In a turbo-machine aft-fan rotor having a plurality of blades circumferentially spaced around the entire periphery of the rotor, each blade including a turbine section, and a compressor section with an interconnecting transition section, sealing means for sealing the spacer between adjacent blades at the transition section comprising a box-like thin-walled seal member, means to support said seal member between adjacent blade transition sections in abutting relation to each blade to prevent gas exchange at the transition section of the blade between the turbine and compressor sections of the blade, said means to support said seal member including a projecting lug attached to at least one of said adjacent blades and interfitting with the seal member.

4. In a turbo-machine rotor having a plurality of blades circumferentially spaced around the entire periphery of said rotor, sealing means for sealing the space between adjacent blades comprising a box-like structure fabricated of sheet material, said box-like structure having intermediate support walls located internally, means to support said sealing means between adjacent blades with a wall adjacent to each adjacent blade, said means to support including a projecting lug attached to at least one of the adjacent blades, an opening in the adjacent sealing means wall which loosely interfits with said lug whereby said sealing means is maintained in position by such support means and vibrations between adjacent blades are damped by the inter rubbing of the lug and the adjacent sealing means wall.

References Cited in the file of this patent

UNITED STATES PATENTS

| | | |
|---|---|---|
| 1,747,690 | Allen | Feb. 18, 1930 |
| 2,999,631 | Wollershauser | Sept. 12, 1961 |

FOREIGN PATENTS

| | | |
|---|---|---|
| 863,036 | Great Britain | Mar. 15, 1961 |
| 869,335 | Great Britain | May 31, 1961 |